United States Patent
Mannan

(10) Patent No.: US 9,017,490 B2
(45) Date of Patent: Apr. 28, 2015

(54) ULTRA HIGH STRENGTH ALLOY FOR SEVERE OIL AND GAS ENVIRONMENTS AND METHOD OF PREPARATION

(75) Inventor: Sarwan Kumar Mannan, Barboursville, WV (US)

(73) Assignee: Huntington Alloys Corporation, Huntington, WV (US)

( * ) Notice: Subject to any disclaimer, the term of this patent is extended or adjusted under 35 U.S.C. 154(b) by 231 days.

(21) Appl. No.: 12/742,445

(22) PCT Filed: Nov. 18, 2008

(86) PCT No.: PCT/US2008/083880
§ 371 (c)(1),
(2), (4) Date: Sep. 15, 2010

(87) PCT Pub. No.: WO2009/067436
PCT Pub. Date: May 28, 2009

(65) Prior Publication Data
US 2011/0011500 A1    Jan. 20, 2011

Related U.S. Application Data

(60) Provisional application No. 60/988,957, filed on Nov. 19, 2007, provisional application No. 61/013,647, filed on Dec. 14, 2007.

(51) Int. Cl.
| | |
|---|---|
| C22C 19/05 | (2006.01) |
| C22C 30/02 | (2006.01) |
| C22C 30/00 | (2006.01) |
| C22F 1/10 | (2006.01) |
| C22F 1/16 | (2006.01) |
| F16L 19/02 | (2006.01) |

(52) U.S. Cl.
CPC .............. *F16L 19/02* (2013.01); *C22C 19/055* (2013.01); *C22C 19/056* (2013.01); *C22F 1/10* (2013.01)

(58) Field of Classification Search
CPC ...... C22C 19/05; C22C 19/055; C22C 19/056
USPC .......... 420/448, 582, 587; 148/428, 410, 677, 148/707, 419
See application file for complete search history.

(56) References Cited

U.S. PATENT DOCUMENTS

| | | |
|---|---|---|
| 3,015,558 A | 1/1962 | Grant et al. |
| 3,519,419 A | 7/1970 | Gibson et al. |
| 4,358,511 A | 11/1982 | Smith, Jr. et al. |
| 4,750,950 A | 6/1988 | Clatworthy et al. |
| 4,788,036 A | 11/1988 | Eiselstein et al. |
| 4,908,069 A | 3/1990 | Doherty et al. |
| 4,979,995 A | 12/1990 | Hattori et al. |
| 5,000,914 A | 3/1991 | Igarashi et al. |
| 5,556,594 A * | 9/1996 | Frank et al. ................... 420/448 |
| 5,945,067 A | 8/1999 | Hibner et al. |
| 6,004,408 A | 12/1999 | Montagnon |
| 6,315,846 B1 | 11/2001 | Hibner et al. |
| 6,458,318 B1 | 10/2002 | Nishiyama et al. |
| 6,623,869 B1 | 9/2003 | Nishiyama et al. |
| 6,730,264 B2 * | 5/2004 | Cao .............................. 420/448 |
| 7,416,618 B2 | 8/2008 | Mannan et al. |

FOREIGN PATENT DOCUMENTS

| | | |
|---|---|---|
| CN | 1258756 A | 7/2000 |
| EP | 0052941 A1 | 6/1982 |
| EP | 0056480 A2 | 7/1982 |
| EP | 0268241 A2 | 5/1988 |
| EP | 0424277 A1 | 4/1991 |
| EP | 0601915 A1 | 6/1994 |
| JP | 63140055 A | 6/1988 |
| JP | 4157125 A | 5/1992 |
| JP | 7331368 A | 12/1995 |

OTHER PUBLICATIONS

Cayard et al., "Serviceability of 13Cr Tubulars in Oil and Gas Production Environments", Corrosion 98, NACE International, 1998, pp. 1-8, Paper No. 112.

Hibner et al., "Comparison of Corrosion Resistance of Nickel-base Alloys for OCTG's and Mechanical Tubing in Severe Sour Service Conditions", Corrosion 2004, NACE International, 2004, pp. 1-15, Paper No. 04110.

Xie et al.; "TTT Diagram of a Newly Developed Nickel-Base Superalloy—Allvac 718Plus"; Superalloys 718, 625, 706 and Derivatives; 2005; pp. 193-202; TMS (The Minerals, Metals % Materials Society).

* cited by examiner

Primary Examiner — Jessee Roe
(74) Attorney, Agent, or Firm — The Webb Law Firm

(57) ABSTRACT

A high strength, corrosion resistant alloy suitable for use in oil and gas environments includes, in weight %: 0-12% Fe, 18-24% Cr, 3-6.2% Mo, 0.05-3.0% Cu, 4.0-6.5% Nb, 1.1-2.2% Ti, 0.05-0.4% 0.05-0.2% Al, 0.005-0.040% C, balance Ni plus incidental impurities and deoxidizers. A ratio of Nb/(Ti+Al) is equal to 2.5-7.5 to provide a desired volume fraction of γ' and γ" phases. The alloy has a minimum yield strength of 145 ksi.

13 Claims, No Drawings

United States Patent US 9,017,490 B2

ULTRA HIGH STRENGTH ALLOY FOR SEVERE OIL AND GAS ENVIRONMENTS AND METHOD OF PREPARATION

BACKGROUND OF THE INVENTION

1. Field of the Invention

The present invention relates to an alloy suitable for severe oil and gas environments and, more particularly, to an ultra high strength alloy whose unique microstructure is obtained by special annealing and age hardening conditions, resulting in a combination of yield strength, impact strength, ductility, corrosion resistance, thermal stability and formability, making the alloy suitable for corrosive oil well applications that contain gaseous mixtures of carbon dioxide and hydrogen sulfide.

2. Description of Related Art

As shallow and less corrosive oil wells deplete, higher strength and more corrosion resistant materials are needed to allow for deeper drilling and for highly corrosive wells to operate successfully. Mildly corrosive wells are handled by various 13Cr steels. The 13% Cr alloys, however, lack the moderate corrosion resistance and strength required of deeper corrosive well applications that contain gaseous mixtures of carbon dioxide and hydrogen sulfide. Cayard et at, in "Serviceability of 13Cr Tubulars in Oil and Gas Production Environments," published sulfide stress corrosion data that indicate 13Cr alloys have insufficient corrosion resistance for wells that operate in the transition region between sour gas and non-sour gas environments. NACE Paper No. 112, 1998, pp. 1-8, the contents of which are incorporated by reference herein.

Of further background are the following publications which are also incorporated by reference herein:

U.S. Pat. No. 4,788,036 dated Nov. 29, 1988, to Eiselstein et at;

U.S. Pat. No. 6,458,318 dated Oct. 1, 2002, to Nishiyama et at; and

Hibner et at publication entitled "Comparison of Corrosion Resistance of Nickel-base Alloys for OCTG's and Mechanical Tubing in Severe Sour Service Conditions", NACE Paper No. 04110, 2004, pp. 1-15.

Ni-base alloys are needed for the more highly corrosive environments. Commonly used high performance alloys for oil patch application, such as 925, 718, G-3, MP35N, TI-6246, C-276 and 725 are either too expensive or do not have the necessary combination of high strength and corrosion resistance. It is an object of this invention to provide a high strength and corrosion resistant alloy at a reasonable cost.

SUMMARY OF THE INVENTION

The present invention is directed to a Ni—Fe—Cr—Mo—Cu alloy composition optimized to provide improved corrosion resistance. Additionally, Nb, Ti and Al are optimized to produce a fine dispersion of gamma prime and gamma double prime to provide high strength. Thus, a primary object of this invention is to provide a ductile, high strength, high impact strength, and corrosion resistant alloy for the production of round bars and tubing, particularly for gas and/or oil well applications. Briefly stated, the present alloy preferably comprises in weight %: up to 15% Fe, 18-24% Cr, 3-9% Mo, 0.05-3.0% Cu, 3.6-6.5% Nb, 0.5-2.2% Ti, 0.05-1.0% Al, 0.005-0.040% C, balance Ni plus incidental impurities and deoxidizers. The method of the present invention includes a final heat treatment including solution annealing followed by quenching or air cooling and aging.

DETAILED DESCRIPTION OF THE INVENTION

The chemical compositions set forth throughout this invention are in weight percentages unless otherwise specified. In accordance with the present invention, the alloy broadly contains 0-15 wt. % Fe, 18-24 wt. % Cr, 3-9 wt. % Mo, 0.05-3.0 wt. % Cu, 3.6-6.5 wt. % Nb, 0.5-2.2 wt. % Ti, 0.05-1.0 wt. % Al, 0.005-0.40 C, balance Ni plus incidental impurities and deoxidizers. In addition, the Nb/(Al+Ti) ratio in the alloy composition is within the range of 2.5 to 7.5 in order to provide desired volume fractions of $\gamma'$ and $\gamma''$ phases for high strength. More preferably, the alloy of the present invention contains 5-15% Fe, 18-23% Cr, 3-7.5% Mo, 0.1-3.0% Cu, 3.6-6.4% Nb, 0.6-2.1% Ti, 0.1-1.0% Al; 0.005-0.030% C, balance Ni plus incidental impurities and deoxidizers. Still more preferably, the alloy of the present invention contains 6-12% Fe, 19-22% Cr, 3.5-7.0% Mo, 1.0-3.0% Cu, 4.0-6.2% Nb, 0.8-2.0% Ti, 0.1-0.7% Al, 0.005-0.020% C, balance Ni plus incidental impurities and deoxidizers. Nominally, the alloy of the instant invention consists essentially of about 8% Fe, 20.5% Cr, 4% Mo, 2% Cu, 5.5% Nb, 1.5% Ti, 0.2% Al, 0.01% C, balance Ni plus incidental impurities and deoxidizers. The ratio of Nb/(Ti+Al) is in the range of 2.5-7.5 to provide the desired combination of volume fractions of $\gamma'$ and $\gamma''$ phases for high strength.

As used herein, all alloy constituent additions are expressed in % by weight unless otherwise indicated.

Nickel (Ni) modifies the Fe-based matrix to provide a stable austenitic structure, which is essential for good thermal stability and formability. Ni is one of the main elements which forms $Ni_3Al$-type $\gamma'$, which is essential for high strength. Furthermore, about 40% by weight Ni is required to have good aqueous stress corrosion resistance. Rather high Ni content increases metal cost. Ni is the balance element, and its range is broadly defined as 35-70%. A preferable Ni content is 40-65% and, more preferably, the Ni content is 50-60%.

Alloying with iron (Fe) was found to increase strength, since Fe is known as a substitution solid solution strengthener for nickel matrix. It was discovered that an Fe content of 0-15% was preferred for high temperature strength and stability and, more preferably, an Fe content of 5-15% and, still more preferably, an Fe content of 6-12%.

Chromium (Cr) is essential for corrosion resistance. A minimum of about 12% Cr is needed for aggressive corrosive environment, but higher than 25% Cr tends to result in the formation of $\alpha$-Cr and sigma phases, which are detrimental for mechanical properties. The Cr range is preferably defined as 18-24%, more preferably 18-23%, and, still more preferably, 19-22% Cr.

An addition of 1% molybdenum (Mo) is known to increase pitting corrosion resistance. The addition of Mo also increases the strength of Ni—Fe alloys by substitution solid solution strengthening since the atomic radius of Mo is much larger than Ni and Fe. However, higher than about 10% Mo tends to form $Mo_7(Ni, Fe, Cr)_6$-type μ-phase or ternary σ-phases with Ni, Fe and Cr. These phases degrade workability. Also, being expensive, higher Mo contents unnecessarily increase the cost of the alloy. The Mo range is preferably 3-9% and, more preferably, 3.0-7.5% and, still more preferably, 3.5-7.0% Mo.

Copper (Cu) improves corrosion resistance in non-oxidizing corrosive environments. The synergistic effect of Cu and Mo is recognized for countering corrosion in typical oil patch applications where there is reducing acidic environments containing high levels of chlorides. The Cu range is defined as 0.05-3.0% and, more preferably, 1.0-3.0%. It is surprising that within the preferred compositional range of the present invention, it is possible to obtain high strength and corrosion resistance with the optimized addition of Cu.

Aluminum (Al) additions result in the formation of $Ni_3$(Al)-type γ', which contributes to high strength. A certain minimum content of Al is required to trigger the formation of γ'. Further, the strength of an alloy is proportional to the volume fraction of γ'. A rather high volume fraction of γ', however, results in degradation in hot workability. The aluminum range is defined as 0.05-1.0%, more preferably 0.1-0.7% and, still more preferably, 0.1-0.5%.

Titanium (Ti) incorporates into $Ni_3$(Al) to form $Ni_3$(AlTi)-type γ', which increases the volume fraction of γ' and, hence, the strength. The strengthening potency of γ' primarily depends on the lattice mismatch between γ' and the matrix. The synergistic increase in Ti and decrease in Al is known to increase the strength by increasing lattice mismatch. Ti and Al contents were optimized to maximize lattice mismatch. Another important benefit of Ti is that it ties up N present in the alloys as TiN. Lowering the N content in the matrix improves hot workability. An exceedingly large amount of Ti leads to precipitation of $N_3Ti$-type η phase, which degrades hot workability and ductility. The titanium range is defined as 0.5-2.2% and, more preferably, 0.8-2.0% and, still more preferably, 0.8-1.5% Ti.

Niobium (Nb) combines with $Ni_3$(AlTi) to form $Ni_3$(AlTiNb)-type γ', which increases the volume fraction of γ' and, hence, the strength. Further, an increase in Nb increases the atomic % of Nb in γ' resulting in a change in the crystal structure to a different phase called γ". It was discovered that a ratio of Nb/(Ti+Al) in the range of 2.5-7.5 was essential to produce the desired combination of volume fractions γ' and γ" for high strength.

In addition to this strengthening effect, Nb ties up C as NbC, thereby decreasing C content in the matrix. The carbide forming ability of Nb is higher than that of Mo and Cr. Consequently, Mo and Cr are retained in the matrix in the elemental form, which are essential for corrosion resistance. Further, Mo and Cr carbides have a tendency to form at the grain boundaries, whereas NbC is formed through the structure. Elimination/minimization of Mo and Cr carbides improves ductility. An exceedingly high content of Nb tends to form σ-phase and excessive amounts of NbC and γ''', which are detrimental for processability and ductility. The Nb range is preferably 3.6-6.5%, more preferably 3.6-6.4% and, still more preferably, 4.0-6.2%.

Additionally, the alloy contains incidental impurities (less than 0.05% each) like Mn, Si, Ca, Mg and W. Examples of the alloys evaluated are set forth below.

Table 1 shows chemical compositions of the different sample heats and Table 2 shows annealing and age hardening conditions used on those sample heats. Mechanical properties determined after annealing and age hardening are listed in Table 3. Time-to-failure ratios, elongation ratios and reduction-of-area ratios for air to environments are listed in Tables 4 and 5.

TABLE 1

Chemical Compositions of the Heats (% by weight)

| Heat # | Ni | Fe | Cr | Mo | Cu | C | Al | Nb | Ti | Nb/Al + Ti |
|---|---|---|---|---|---|---|---|---|---|---|
| HV0664 | 58.6 | 7.9 | 20.4 | 8.0 | — | 0.014 | 0.3 | 3.3 | 1.5 | 1.83 |
| HV0665 | 59.6 | 8.1 | 21.1 | 5.1 | — | 0.013 | 0.3 | 4.2 | 1.6 | 2.21 |
| HV0667 | 59.0 | 8.1 | 21.1 | 5.2 | — | 0.017 | 0.4 | 4.2 | 2.0 | 1.75 |
| HV0722* | 53.7 | 12.0 | 20.5 | 6.2 | 1.9 | 0.004 | 0.3 | 4.3 | 1.1 | 3.07 |
| HV0724* | 53.4 | 12.1 | 20.6 | 6.2 | 1.9 | 0.004 | 0.1 | 4.8 | 0.9 | 4.8 |
| HV0765 | 65.1 | 1.1 | 21.2 | 6.0 | — | 0.008 | 0.3 | 5.2 | 2.1 | 2.17 |
| HV0826* | 53.6 | 12.0 | 20.5 | 6.2 | 2.0 | 0.008 | 0.1 | 4.6 | 1.0 | 4.18 |
| HV0827* | 53.1 | 12.0 | 20.5 | 6.2 | 2.0 | 0.006 | 0.1 | 5.0 | 1.1 | 4.17 |
| HV0828A* | 53.0 | 13.0 | 20.5 | 5.8 | 2.3 | 0.007 | 0.1 | 4.2 | 1.1 | 3.5 |
| HV0829* | 54.6 | 10.0 | 20.2 | 7.6 | 1.9 | 0.005 | 0.1 | 4.6 | 1.0 | 4.18 |
| HV0830* | 51.9 | 13.5 | 20.5 | 6.2 | 2.0 | 0.006 | 0.1 | 4.7 | 1.1 | 4.27 |
| HV0831* | 51.5 | 14.2 | 20.7 | 5.4 | 2.0 | 0.007 | 0.1 | 5.0 | 1.1 | 4.17 |
| D5-8323* | 53.0 | 13.0 | 20.5 | 5.9 | 1.8 | 0.008 | 0.1 | 4.7 | 1.0 | 3.91 |
| D5-8324 | 54.9 | 13.0 | 20.4 | 5.9 | — | 0.007 | 0.1 | 4.7 | 1.0 | 3.91 |
| HV1142* | 58.0 | 8.0 | 20.6 | 4.1 | 1.9 | 0.009 | 0.4 | 6.0 | 1.0 | 4.29 |
| HV1143* | 57.6 | 7.9 | 20.6 | 4.1 | 1.9 | 0.004 | 0.4 | 6.0 | 1.5 | 3.16 |
| HV1144* | 56.8 | 8.0 | 20.7 | 4.1 | 1.9 | 0.004 | 0.4 | 6.1 | 2.0 | 2.54 |
| HV1154* | 57.7 | 8.0 | 20.7 | 4.1 | 1.9 | 0.007 | 0.4 | 5.6 | 1.6 | 2.80 |

*Alloys of the invention.

Note:

All the heats were 50 lbs VIM heats except heats D5-8323 and D5-8324, which were 135 lbs VIM + VAR heats. VIM stands for vacuum induction melting and VAR stands for vacuum arc remelting.

TABLE 2

Heat Treatments

| Heat Treatment | Initial Heating | Reheating (Aging) |
|---|---|---|
| A | (1024° C.)1875° F./h, WQ | (718° C.)1325° F./8 h, FC to (621° C.)1150° F./8 h, AC |
| B | (1038° C.)1900° F./h, WQ | (718° C.)1325° F./8 h, FC to (621° C.)1150° F./8 h, AC |
| C | (1038° C.)1900° F./h, WQ | (760° C.)1400° F./8 h, FC to (649° C.)1200° F./8 h, AC |
| D | (1066° C.)1950° F./1 h, WQ | (718° C.)1325° F./10 h, FC to (621° C.)1150° F./8 h, AC |
| E | (1079° C.)1975° F./1 h, WQ | (718° C.)1325° F./8 h, FC to (649° C.)1200° F./8 h, AC |
| F | (1107° C.)2025° F./1 h, WQ | (718° C.)1325° F./10 h, FC to (621° C.)1150° F./8 h, AC |
| G | (1079° C.)1975° F./1 h, WQ | (718° C.)1325° F./8 h, FC to (621° C.)1150° F./8 h, AC |
| H | (1093° C.)2000° F./1 h, WQ | (704° C.)1300° F./8 h, FC to (621° C.)1150° F./8 h, AC |
| I | (1079° C.)1975° F./1 h, WQ | (704° C.)1300° F./8 h, FC to (621° C.)1150° F./8 h, AC |

WQ = water quench; FC = Furnace cool at 100° F. per hour; AC = air cool

TABLE 3

Room Temperature Mechanical Properties

| Alloy # | Heat treatment | YS, ksi | UTS, ksi | % El | ROA, % | Impact strength, ft-lbs | Hardness, Rc |
|---|---|---|---|---|---|---|---|
| HV0664 | C | 130.3 | 184.4 | 28.6 | 44.2 | — | 36.2 |
|  |  | 127.3 | 182.1 | 28.9 | 44.4 |  |  |
| HV0667 | E | 131.6 | 181.5 | 32.0 | 49.1 | 58 | 40.4 |
|  |  | 131.2 | 180.9 | 31.8 | 48.3 |  |  |
| HV0665 | D | 141.4 | 182.9 | 28.8 | 47.4 | 54 | 40.4 |
|  |  | 139.6 | 182.3 | 29.1 | 47.7 |  |  |
| HV0765 | F | 141.3 | 189.1 | 27.6 | 40.1 | 45 | 44.4 |
|  |  | 140.9 | 188.3 | 27.2 | 34.0 |  |  |

Impact and hardness are the averages of three test data. These are 50 lb VIM heats. VIM stands for vacuum induction melting. YS = yield strength; UTS = ultimate tensile strength; % El = elongation; and % ROA = reduction of area, respectively.
The heats listed in Table 3 do not make 145 ksi min yield strength because the Nb/(Al + Ti) ratio for these heats is out of the critical range of 2.5-7.5.

TABLE 4

Room Temperature Mechanical Properties

| Alloy # | Heat treatment | YS, ksi | UTS, ksi | % El | ROA, % | Impact strength, ft-lbs | Hardness, Rc |
|---|---|---|---|---|---|---|---|
| HV0722 | A | 148.9 | 185.1 | 28.1 | 50.4 | 62 | 39.6 |
|  |  | 148.6 | 185.1 | 28.4 | 51.0 |  |  |
| HV0724 | A | 156.6 | 188.3 | 27.1 | 48.3 | 49 | 40.7 |
|  |  | 158.0 | 189.7 | 25.9 | 46.2 |  |  |
| HV0724 | B | 150.5 | 184.6 | 27.6 | 49.5 | 53 | 41.5 |
|  |  | 148.7 | 185.0 | 28.0 | 49.7 |  |  |
| HV0826 | B | 156.6 | 189.8 | 27.3 | 51.5 | 55 | 42.2 |
|  |  | 157.5 | 190.2 | 26.7 | 51.9 |  |  |
| HV0827 | B | 168.4 | 197.7 | 23.1 | 41.8 | 33 | 41.8 |
| HV0828A | B | 148.6 | 184.6 | 27.4 | 47.6 | 44 | 40.8 |
|  |  | — | 185.5 | 27.0 | 47.2 |  |  |
| HV0829 | B | 150.2 | 189.1 | 26.1 | 45.5 | 42 | 40.0 |
|  |  | 149.7 | 188.1 | 27.1 | 46.0 |  |  |
| HV0830 | B | 158.4 | 190.9 | 26.0 | 48.5 | 48 | 41.6 |
|  |  | 156.9 | 190.3 | 26.1 | 49.4 |  |  |
| HV0831 | B | 171.3 | 199.2 | 20.7 | 39.4 | 29 | 40.9 |
| D5-8323 | B | 147.3 | 185.3 | 28.5 | 54.1 | 72 | 41.8 |
|  |  | 147.6 | 185.1 | 29.2 | 56.3 |  |  |
| D5-8324 | B | 150.2 | 189.9 | 28.9 | 55.8 | 79 | 42.1 |
|  |  | 150.8 | 189.7 | 29.4 | 56.5 |  |  |
| HV1142 | G | N/A | 210.8 | 16.2 | 40.2 | 41 | 43 |
| HV1143 | I | 174.0 | 197.9 | 25.1 | 44.2 | 49 | 44 |
|  |  | 173.0 | 200.6 | 24.6 | 38.1 |  |  |
| HV1144 | H | 168.0 | 199.4 | 24.9 | 47.0 | 53 | 44 |
|  |  | 166.1 | 199.2 | 25.0 | 44.5 |  |  |
| HV1145 | H | 167.9 | 202.2 | 23.2 | 43.5 | 30 | 43 |
|  |  | 175.7 | 199.9 | 24.1 | 42.2 |  |  |

Impact and hardness are the averages of three test data. All the heats were 50 lbs VIM heats except heats D5-8323 and D5-8324, which were 135 lbs VIM + VAR heats. VIM stands for vacuum induction melting and VAR stands for vacuum arc remelting. YS = yield strength; UTS = ultimate tensile strength; % El = elongation; and % ROA = reduction of area, respectively.

TABLE 5

Slow Strain Rate Corrosion Test Results

| Test history | TTF, Hours | % EL | % RA | Environment/Air Ratios TTF | % EL | % RA | Average Ratios TTF | % EL | % RA |
|---|---|---|---|---|---|---|---|---|---|
| Air | 23.0 | 27.6 | 57.1 |  |  |  |  |  |  |
| Environment | 23.6 | 28.8 | 51.5 | 1.03 | 1.04 | 0.90 | 1.06 | 1.08 | 0.89 |
| Environment | 24.9 | 30.9 | 50.3 | 1.08 | 1.12 | 0.88 |  |  |  |

Testing was done at 347° F. in 20 wt % NaCl solution under 500 psig $CO_2$ and 500 psig $H_2S$. Time-to-failure (TTF), % elongation, and % reduction-of-areas and their ratios in air/environment are listed below. This was heat D5-8323 with B heat treatment.

TABLE 6

Slow Strain Rate Corrosion Test Results

| Test history | TTF, Hours | % EL | % RA | Environment/Air Ratios | | | Average Ratios | | |
|---|---|---|---|---|---|---|---|---|---|
| | | | | TTF | % EL | % RA | TTF | % EL | % RA |
| Air | 25.9 | 32.3 | 51.5 | | | | | | |
| Environment | 24.8 | 30.4 | 46.3 | 0.96 | 0.94 | 0.90 | 0.91 | 0.88 | 0.89 |
| Environment | 21.9 | 26.1 | 45.9 | 0.85 | 0.81 | 0.89 | | | |

Testing was done at 347° F. in 20 wt % NaCl solution under 500 psig $CO_2$ and 500 psig $H_2S$. Time-to-Failure (TTF), % elongation and % reduction-of-areas and their ratios in air/environment are listed below. This was heat D5-8324 with B heat treatment.

Higher environments/air ratios for Cu-containing alloy D5-8323 (Table 5) than Cu-free alloy D5-8324 (Table 6) shows the criticality of the presence of Cu for corrosion resistance.

Alloys used in severe oil and gas environments must withstand corrosive environments listed in Tables 5 and 6. Further, due to deeper wells, these alloys must have high yield strength and high impact strength. The target for this investigation was 145 ksi minimum yield strength. Scrutinizing Tables 1 to 5, the alloys that satisfy corrosion resistance plus yield strength requirements are made up of the following composition ranges in weight percentage: 0-15% Fe, 18-24% Cr, 3.0-9.0% Mo, 0.05-3% Cu, 3.6-5.5% Nb, 0.5-2.2% Ti, 0.05-1.0% Al, 0.005-0.040% C, balance Ni plus incidental impurities. Further, the Nb/(Al+Ti) ratio in the alloy must be in the range of 2.5-7.5 so as to provide the desired volume fractions of γ' and γ" phases for high strength.

Table 7, below, provides presently preferred ranges of elements that make up the alloy of the invention along with a presently preferred nominal composition.

TABLE 7

Chemical Composition (% by weight)

| | Broad | Intermediate | Narrow | Nominal |
|---|---|---|---|---|
| Fe | 0-15 | 5-15 | 6-12 | 8 |
| Cr | 18-24 | 18-23 | 19-22 | 20.5 |
| Mo | 3-9 | 3.0-7.5 | 3.5-7.0 | 4 |
| Cu | 0.05-3.0 | 0.1-3.0 | 1.0-3.0 | 2 |
| Nb | 3.6-6.5 | 3.6-6.4 | 4.0-6.2 | 5.5 |
| Ti | 0.5-2.2 | 0.6-2.1 | 0.8-2.0 | 1.5 |
| Al | 0.05-1.0 | 0.1-1.0 | 0.1-0.7 | 0.2 |
| C | 0.005-0.040 | 0.005-0.030 | 0.005-0.020 | 0.01 |
| Ni | Bal.* | Bal.* | Bal.* | Bal.* |

*plus incidental impurities and deoxidizers

The alloy of the present invention is preferably prepared using vacuum induction melting+vacuum arc remelting practice to ensure cleanliness on the ingot. The final heat treating method of the present invention (summarized in Table 2) comprises a first solution anneal by heating at between 1750° F. (954° C.) to 2050° F. (1121° C.) for a time of about 0.5-4.5 hours, preferably 1 hour, followed by a water quench or air cooling. The product is then aged preferably by heating to a temperature of at least about 1275° F. (691° C.) and held at temperature for a time of between about 6-10 hours to precipitate γ' and γ" phases, optionally by a second aging heat treatment at about 1050° F. (565° C.) to 1250° F. (677° C.) and held at that temperature to conduct a secondary aging step for about 4-12 hours, preferably for a time of about 8 hours. The material after aging is allowed to air cool to ambient temperature to achieve the desired microstructure and maximize γ' and γ" strengthening.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

The invention claimed is:

1. A high strength, corrosion resistant alloy suitable for use in oil and gas environments, comprising in weight %: 0-12% Fe, 18-24% Cr, 3-6.2% Mo, 0.05-3.0% Cu, 4.0-6.5% Nb, 1.1-2.2% Ti, 0.05-0.2% Al, 0.005-0.040% C, balance Ni plus incidental impurities and deoxidizers, wherein a ratio of Nb/(Ti+Al)=2.5-7.5 to provide a desired volume fraction of γ' and γ" phases and having a minimum yield strength of 145 ksi.

2. The alloy of claim 1 wherein the Ni content is 35-70%.

3. The alloy of claim 1 wherein the Ni content is 40-65%.

4. The alloy of claim 1 wherein the Ni content is 50-60%.

5. The alloy of claim 1 comprising 5-12% Fe, 18-23% Cr, 3.0-6.2% Mo, 0.1-3.0% Cu, 4.0-6.0% Nb, 1.1-2.1% Ti, 0.1-0.2% Al, and 0.005-0.030% C, balance Ni plus incidental impurities and deoxidizers.

6. The alloy of claim 1 comprising 6-12% Fe, 19-22% Cr, 3.5-6.2% Mo, 1.0-3.0% Cu, 4.0-6.2% Nb, 1.1-2.0% Ti, 0.1-0.2% Al, 0.005-0.020% C, balance Ni plus incidental impurities and deoxidizers.

7. A bar or tube suitable for use in corrosive oil/gas wells made from the alloy of claim 1.

8. The alloy of claim 1 comprising 1.0-3.0% Cu.

9. The alloy of claim 1 comprising 4.0-6.5% Nb, 1.1-2.2% Ti and 0.05-0.2% Al.

10. The alloy of claim 1 comprising 5.2-6.2% Nb, 1.1-2.1% Ti and 0.1-0.2% Al.

11. The alloy of claim 1 comprising 5.2-6.0% Nb, 1.1-1.75% Ti and 0.1-0.2% Al.

12. The alloy of claim 1, wherein the Al content is 0.2% Al.

13. A high strength, corrosion resistant alloy suitable for use in oil and gas environments, consisting essentially of in weight %: about 8% Fe, about 20.5% Cr, about 4% Mo, about 2% Cu, about 5.5% Nb, about 1.5% Ti, about 0.2% Al, and about 0.01% C, balance Ni plus incidental impurities and deoxidizers, wherein a ratio of Nb/(Ti+Al)=2.5-7.5 to provide a desired volume fraction of γ' and γ" phases and having a minimum yield strength of 145 ksi.

* * * * *